Patented July 28, 1931

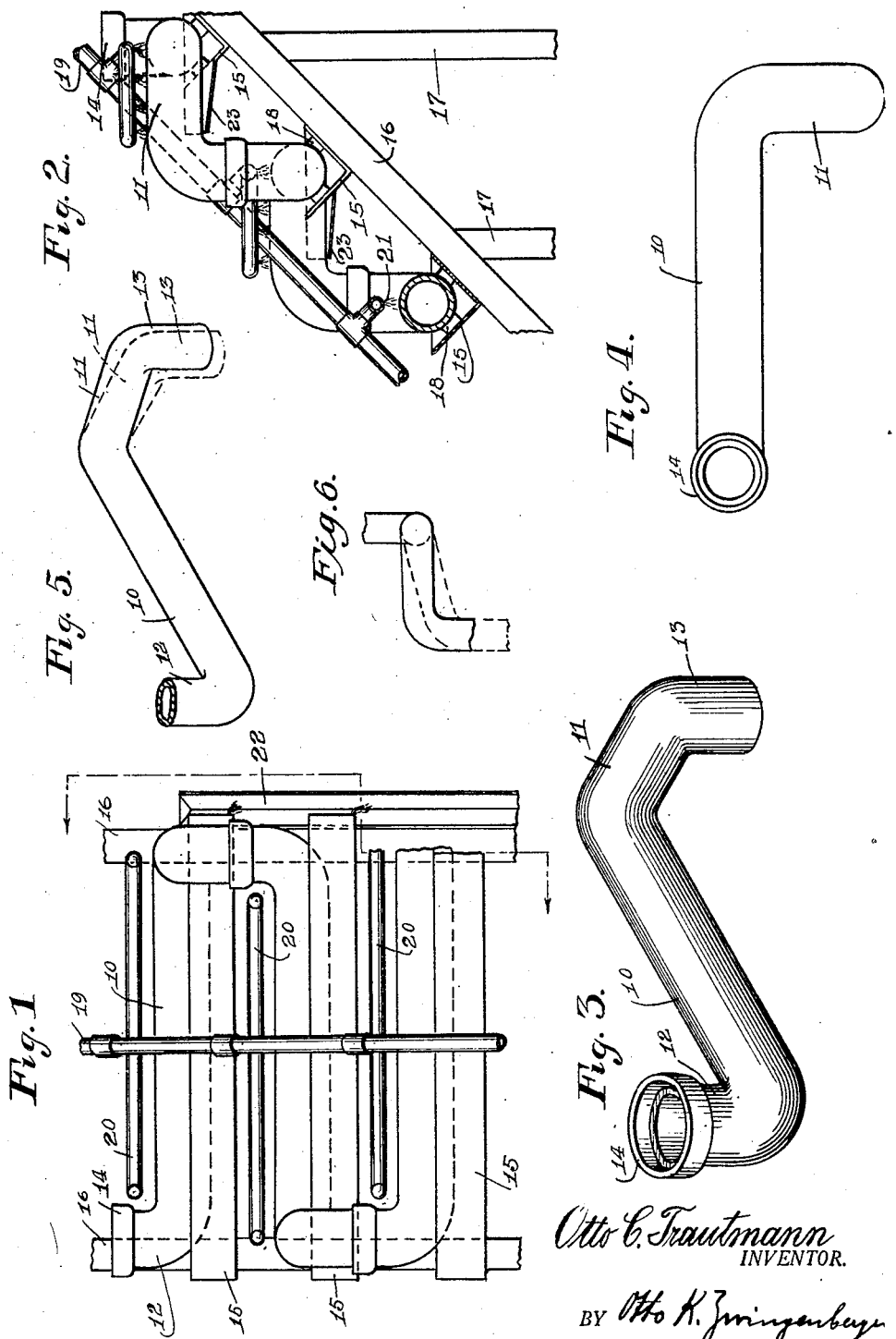

1,816,133

UNITED STATES PATENT OFFICE

OTTO C. TRAUTMANN, OF NEW YORK, N. Y.

CONDENSING APPARATUS

Application filed January 3, 1927. Serial No. 158,460.

My invention relates to an improved condensing chamber adapted for use as a portion of a condensing apparatus serving all general purposes of condensing gases and vapors, such as are primarily used in the chemical industry for the condensation of hydrochloric acid gas, nitrous gases or the like.

Such condensing apparatus were chiefly developed in the LeBlanc soda and allied industries, where the condensation of gases, being a function of temperature and of the concentration of the gases, was usually accomplished by a great number of Woulffe bottles or "tourills," serially joined in a long chain and connected at the end of the same with an absorption tower. The regulation of the temperature of the absorbing liquid, in the case of hydrochloric acid gas, and of the gas itself was in this system for a long time exclusively regulated by air cooling; later on the tourills were set into water boxes, thereby excluding to a considerable extent the direct cooling effect of the air.

Condensing chambers of various forms were then created to overcome certain difficulties, but usually each of these special chambers brought an advantage on the one side with a more or less greater disadvantage on the other side.

In recent years special chambers have met with favor by the chemical industry, these chambers being of small size and allowing to mount the serially joined chambers in vertical stacks, one chamber being arranged above the other. In these modern vertical stacks each chamber is often set into a separate water-box, the water being run in at the top, from there to the next lower box and so on into the box at the bottom; or the water is sprayed upon the top chamber and is conducted downwardly by suitably arranged baffle plates upon the chambers below. By the absorption of the hydrochloric acid gas, however, great heat is generated and it is essential to keep the temperature of the gas and water as low as possible in order to have the absorption of the hydrochloric acid gas by the water take place in an efficient as well as in an economical manner. On account of the great heat generated by this absorption process it stands to reason that cooling water run from the top downwardly from one chamber to the other, must quickly rise in temperature. As, however, just the lower chambers need the most cooling, naturally this warmed water does not exert the proper cooling effect on the lower chambers and the result accomplished by these vertical stacks, though representing a progress over the then prior art, is by no means as economical and efficient as the conditions of the chemical industry now-a-days require.

This insufficient result is not surprising if one considers that such vertical retorts are wrapped up in a cloud of hot vapor ascending from the lower chambers. Naturally this ascending vapor gives off heat to the upper chambers, but particularly shuts off the air from the chambers, thereby excluding almost any chance of having the air also contribute to the cooling effect.

This ascending vapor has furthermore a considerable and rather undesirable effect which ultimately may even lead to a temporary interruption of the operation of the condensing apparatus. Though it is said that the whole surface of each of the condensing chambers in such vertical stacks is cooled by water, it is undoubtedly true that this is only theoretically the case and that in those systems, where the water is sprayed upon the top chamber and is then run successively to each chamber disposed below, actually only the middle part of the chamber is cooled by water, whereas the rounded parts, where the upwardly turned neck and the downwardly turned spigot, respectively, join the middle part, are not rinsed at all and are exposed to the ascending vapor which condenses and drops from the upper rounding of a neck upon the opposite rounding of a spigot below to finally accumulate in the groove of the cemented joint between such spigot with the neck of the next following chamber. In the case of absorbing hydrochloric acid gas there is usually a trace of such gas in the air surrounding a not quite satisfactorily working condensing apparatus, the condensate of steam on these roundings absorbs these traces of acid and forms a solution of hydrochloric acid strong enough to eat a hole through the cement of the joint thereby causing a most disturbing leak.

In view of the shortcomings described above, it is the main object of the invention to provide a condensing chamber of such particular form that it can be readily assembled into a condensing apparatus in such manner that each single individual condensing chamber can be separately and directly cooled by water in an efficient and economical manner.

It is a further object of the invention to provide a condensing chamber of such particular form that it can be readily assembled into a condensing apparatus in which each single individual condensing chamber is in such spaced relation with the others that the vapor generated by the cooling of each single individual chamber can ascend directly into the atmosphere without striking directly any of the adjoining chambers, that the spaced relation between the individual condensing chambers allows a current of air to strike through between them so that the draft of the air over the chambers causes an evaporation of water and that the reduction of temperature obtained thereby helps to increase the cooling effect on such chambers.

The invention also resides in certain other features of construction and in the combination and arrangements of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views and in which Figure 1 is a front elevation of a plurality of my new condensing chambers serially joined together and indicating the principle upon which the condensing apparatus is assembled;

Figure 2 is a side elevation of the said condensing apparatus;

Figure 3 shows a perspective view of a single individual of my new condensing chamber as embodied in the condensing apparatus illustrated by Figures 1 and 2;

Figure 4 is a top view of the element shown by Figure 3;

Figures 5 and 6 are front and side views respectively of a modification in the form of the chamber illustrated by Figure 3, the modification, or variation, indicating how by slightly varying the angular relation between the members of a single individual condensing chamber important technical effects can be obtained.

Before going into the details of the construction of the condensing apparatus described below, I wish to state that each of the individual condensing chambers, joined together, is, though not necessarily, alike in form and that the material, of which these chambers are made, is not an essential factor of the invention, that any metal, such as iron, copper, aluminum, or the like may just as well come in consideration as any acid resisting material, such as for instance earthenware, porcelain, silica; that however, for the purpose of condensing acid gases or vapors, I prefer to make the said condensing chambers of fused silica. Moreover, inasmuch as the subjectmatter of this invention relates exclusively to the form and arrangement of the individual condensing chambers so as to allow such cooling agents as water and air to exert their influence on the outside of the said chambers, the inside of these chambers is generally not taken into consideration in the following specification; it may suffice for the present to say that the chambers are of course hollow.

My new condensing chamber consists essentially of, for instance, a circular tube bent repeatedly in substantially right angles so as to form a tube or hollow body 10 and a tube or annex 11, the body 10 terminating in an upwardly bent neck 12 disposed perpendicularly to the said body 10, the annex terminating in a spigot 13 perpendicularly depending from the said annex 11. Both the body 10 and its annex 11 are axially disposed in the same plane, the neck 12 with the body 10 in one plane, and finally the spigot 13 with the annex 11 in one plane; the neck 12 and the spigot 13 lie in planes parallel to each other. The neck 12 terminates in a bell 14 of such dimensions that the spigot of another chamber can be inserted and tightened therein by way of the well known acid proof cements (not shown).

It is by no means necessary or essential all the members of an individual condensing chamber be of the same, for instance of circular cross-section, any other shape of the same will be suitable as long as it answers the conditions of the work; and the body 10 may conveniently be extended sidewardly so as to have a flat shape, of elliptical or substantially rectangular cross-section.

Figures 1 and 2 show that each individual condensing chamber is disposed horizontally with its body 10 within a V-shaped trough 15 secured to the posts 16 inclined substantially at an angle of 45° and forming part of a frame-construction 17 supporting the interconnected condensing chambers. This construction 17 may be of any suitable material, for instance wood. Within each trough 15 a body 10 is kept in a slightly elevated position above the walls of the same by means of a few wooden blocks 18 so as to keep practically the entire surface of the chamber available for cooling. A main water pipe 19 is arranged above the whole apparatus equidistantly from and parallel to the posts 16 and a branch pipe 20 extends over each of the condensing chambers all along the body 10 and its annex 11 at some distance above the same. These branch pipes 20 are provided along their lowest point with a line of perforations 21 through which water is sprayed over the whole surface of each condensing chamber. The troughs 15 are slightly inclined towards the right and project sufficiently beyond the post 16 on that side so as to discharge the surplus of the cooling water into an open gutter or other suitable means for carrying off said water.

In order to have the cooling water of each condensing chamber run off by the trough in which said chamber is arranged, an apron 23 is secured below each annex 11 so that the water running off the same is conducted into the trough supporting the respective chamber. Said apron 23 is suitably made of a slightly bent strip of sheet metal or the like and has approximately a width equal to the diameter of the annex; such an apron 23 is indicated only in figure 2 below the upper condensing chambers for the reason of not crowding the figures too much.

The condensing apparatus illustrated by figures 1 and 2 is assembled by joining condensing chambers, each of which has the annex alternately disposed at the other side and in which the length of the body is a multiple of that of the annex; the apparatus thus obtained answers the requirements of the chemical industry in a great number of cases. Nowhere, however, is there such a great variety of requirements under apparently similar conditions as in the chemical industry and often space has to be given just as much consideration as chemical matters. Many such situations are readily met by changing the dimensions and the spaced relation of some of the members of my new condensing chamber without departing from the spirit or sacrificing the advantages of my invention.

I can of course make the longitudinal dimensions of the body 10 and of its annex 11 of any proportion whatever. From Fig. 2, however, it can be derived that the longitudinal axis of the neck of one of the vessels and that the spigot of the adjoining upper vessel will intersect with the longitudinal axis of the annex 11 of said upper vessel at an angle of substantially 90°; this angle will be absolutely 90° if the lengths of the perpendicular and that of the longitudinal axis, measured from the center of the respective body 10, are equal; it will be slightly smaller than 90° if the annex is slightly raised and larger if it is deflected. Moreover I can create a variety of arrangements for instance by assembling condensing chambers which have the annex disposed in one and the same direction. By such variations I can fill wide demands governed by considerations of space; for instance, if I make the body and its annex equally long and use only such chambers having the annex disposed in one and the same direction, the same can be serially joined to form a coil which can be easily mounted on a square shaped tower without abandoning the separate cooling by water of each condensing chamber and the other advantages outlined above.

Another variation of my new condensing chamber can easily be made and combined with the condensing chamber illustrated by Figures 3 and 4 as well as with the varied forms just described above. Contrary to the arrangement illustrated by Figures 3 and 4 I can furthermore vary my new condensing chamber by causing the annex to ascend towards the spigot as illustrated by Figure 5, the spigot 13 to depend also in this variation perpendicularly as in that illustrated by Figures 3 and 4. If such a condensing chamber with a horizontally disposed body, having an ascending annex, is filled with water, the pool of water kept in the vessel will be of even depth, but that in the annex will shallow out towards the spigot. It is evident that the depth of the water in the vessel is exclusively governed by the angle of the ascending annex towards the horizontal plane. This feature allows in the easiest way to control the amount of water within the condensing chambers and as in the manufacture of such chambers with ascending annexes the degree of elevation can be varied without difficulty, wide demands in this particular point can be easily satisfied. These features are of great importance in the condensation of hydrochloric acid gas and as one endeavors in this art to keep the amount of condensing water in the apparatus as low as possible I keep the elevation of the annex within moderate limits, in the highest approximately one third of the diameter of that of the body or annex. This arrangement also has the advantage that it offers a great surface of water to the gas and at the same time offers a wide and clear passageway for the gases so that they can travel unhindered through the apparatus with the same uniform speed.

In the variation illustrated by Figure 5 the annex is preferably kept in the form of a straight tube, but as even a curved annex would also have a similar effect, such a curved annex or similar variation of the same would come within the scope of my invention and of the appended claims for the same.

From the above description of the vessel 10 and its annex 11 together with the neck 12 and the spigot 13 it is self evident that each part is integrally connected with the other and such integral connection is given to the members of my new condensing chamber whatever the shape of the body 10 may be.

What I claim is:

In a condensing apparatus the combination of an inclined support, a main water supply pipe, V-shaped troughs arranged on said inclined support, a gutter below one end of said troughs, a plurality of condensing chambers each consisting of a horizontally disposed tubular body with an annex at one of its ends extending slightly ascendingly in a lateral direction and communicating with the aforesaid body, a downturned spigot at the end of the annex, the other end of the body being provided with an upturned neck terminating in a bell, the condensing chambers being arranged like a stairway on the inclined support with the horizontally disposed bodies in the aforesaid troughs, and being serially joined by having the spigot of one condensing chamber telescoped into the bell shaped neck of the next following condensing chamber, and an individual cooling water supply pipe over the horizontally disposed body and the annex of each condensing chamber, the V-shaped trough collecting and discharging into the gutter any excess of cooling water.

In testimony whereof I have hereunto set my hand this 31st day of December, 1926.

OTTO C. TRAUTMANN.